United States Patent
Sakhnini et al.

(10) Patent No.: US 10,404,443 B2
(45) Date of Patent: Sep. 3, 2019

(54) HD-FDD HARQ OPERATION

(71) Applicant: QUALCOMM Incorporated, San Diego, CA (US)

(72) Inventors: Iyab Issam Sakhnini, San Diego, CA (US); Tingfang Ji, San Diego, CA (US); Hao Xu, San Diego, CA (US); Wanshi Chen, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/706,856

(22) Filed: May 7, 2015

(65) Prior Publication Data

US 2015/0326381 A1   Nov. 12, 2015

Related U.S. Application Data

(60) Provisional application No. 61/991,230, filed on May 9, 2014.

(51) Int. Cl.
| | |
|---|---|
| H04L 5/16 | (2006.01) |
| H04B 1/52 | (2015.01) |
| H04L 5/00 | (2006.01) |
| H04L 1/18 | (2006.01) |
| H04L 5/14 | (2006.01) |
| H04L 1/00 | (2006.01) |

(52) U.S. Cl.
CPC ............. *H04L 5/16* (2013.01); *H04B 1/52* (2013.01); *H04L 1/1822* (2013.01);
(Continued)

(58) Field of Classification Search
None
See application file for complete search history.

(56) References Cited

U.S. PATENT DOCUMENTS 9,030,973 B2 *  5/2015  Park ................. H04W 72/0406
                                                      370/280
2009/0296609 A1  12/2009  Choi et al.
(Continued)

FOREIGN PATENT DOCUMENTS

CN          101997663 A        3/2011

OTHER PUBLICATIONS

Huawei, HiSilicon: "Impact of Half Duplex on MTC Demodulation Performance Requirement", 3GPP TSG-RAN WG4 Meeting #70, Prague, Czech Republic, Feb. 10-14, 2014, R4-140334, 1 page.
(Continued)

*Primary Examiner* — Alex Skripnikov
(74) *Attorney, Agent, or Firm* — Holland & Hart LLP

(57) ABSTRACT

Methods, systems, and devices for half-duplex frequency division duplexing (HD-FDD) hybrid automatic repeat request (HARQ) operation are described. The base station may receive a message from a user equipment (UE) indicative of a duplexing capability of the UE. The base station may then select a HARQ process limit based on the duplexing capability. In some examples, the base station may anticipate a collision between an uplink (UL) transmission and a downlink (DL) subframe based on the selected HARQ process limit. The base station may then schedule a transmission to avoid the anticipated collision. In some examples, the base station may limit a number of configurations available for channel quality indicator (CQI) or a precoding matrix indicator (PMI).

33 Claims, 13 Drawing Sheets

(52) U.S. Cl.
CPC .......... *H04L 1/1887* (2013.01); *H04L 1/1896* (2013.01); *H04L 5/0073* (2013.01); *H04L 5/0091* (2013.01); *H04L 5/0092* (2013.01); *H04L 5/1438* (2013.01); *H04L 1/0027* (2013.01); *H04L 5/0055* (2013.01)

(56) References Cited

U.S. PATENT DOCUMENTS

| | | | |
|---|---|---|---|
| 2012/0127897 A1 | 5/2012 | Xu et al. | |
| 2013/0242824 A1 | 9/2013 | Lee et al. | |
| 2013/0250772 A1 | 9/2013 | Yin | |
| 2014/0078941 A1* | 3/2014 | Seo ................ | H04L 1/1822 370/280 |
| 2014/0092794 A1* | 4/2014 | Yang ............... | H04B 7/2656 370/280 |
| 2014/0198701 A1* | 7/2014 | Ostergaard ......... | H04W 76/048 370/311 |
| 2014/0247742 A1* | 9/2014 | Lee ................. | H04W 52/0216 370/252 |
| 2014/0321338 A1* | 10/2014 | Park ............... | H04B 1/005 370/280 |
| 2014/0328228 A1* | 11/2014 | Park ............... | H04B 7/2615 370/280 |
| 2015/0029905 A1* | 1/2015 | Yi ................. | H04L 1/0026 370/277 |
| 2015/0063250 A1* | 3/2015 | Lahetkangas ........ | H04L 1/1812 370/329 |
| 2016/0081110 A1* | 3/2016 | Suzuki ............. | H04W 52/0229 370/336 |

OTHER PUBLICATIONS

Huawei, HiSilicon, "Test Setup for MTC Test Cases with Half Duplexing Mode", 3GPP TSG-RAN WG4 Meeting #70bis, San Jose Del Cabo, Mexico, Mar. 31-Apr. 4, 2014, R4-141670, 2 pages.

Catt, "Number of HARQ Processes for Low Complexity HD-FDD UEs," 3GPP TSG RAN WG1 Meeting #76bis, Shenzhen, China, Mar. 31-Apr. 4, 2014, R1-141181, pp. 1-3, 3rd Generation Partnership Project.

Ericsson, "Half Duplex FDD for Low Cost MTS UE," 3GPP RAN WG1 Meeting #76bis, Shenzhen, P.R. China, Mar. 31-Apr. 4, 2014, R1-141631, pp. 1-2, 3rd Generation Partnership Project.

Institute for Information Industry (III),"Test Proposal for TR 36.888 on Restriction of Techniques to Low Performance MTC UEs," 3GPP TSG RAN WG1 Meeting #69, Prague, Czech Republic, May 21-25, 2012, R1-122750, 5 pgs., 3rd Generation Partnership Project.

Intel Corporation, "New UE Category/Type for Low Cost MTC," 3GPP RAN WG1 Meeting #74bis, Guangzhou, China, Oct. 7-11, 2013, R1-134128, pp. 1-8, 3rd Generation Partnership Project.

Intel Corporation, "Remaining Aspects for Low Cost MTC UE," 3GPP RAN WG1 Meeting #76bis, Shenzhen, China, Mar. 31-Apr. 4, 2014, R1-141149, pp. 1-3, 3rd Generation Partnership Project.

ISA/EPO, International Search Report and Written Opinion of the International Searching Authority, Int'l. App. No. PCT/US2015/029917, dated Jul. 27, 2015, European Patent Office, Rijswijk, NL, 13 pgs.

Ericsson: "Impacts of Half-Duplex FDD UE Operation on RAN2 Specifications", 3GPP Draft; R2-082150, 3GPP TSG-RAN WG2#62, 3rd Generation, Partnership Project (3GPP), Mobile Competence Centre; 650, Route Des Lucioles; F-06921 Sophia-Antipolis Cedex; France, vol. RAN WG2, No. Kansas City, USA; May 2008, XP058139929, URL:http://www.3gpp.org/ftp/tsg_ran/WG2_RL2/TSGR2_62/Docs/R2-082150.zip ,7 pages.

Huawei, et al., "Consideration on HD-FDD for Low-Cost MTC," 3GPP TSG-RAN WG1#68b R1-121003, Mar. 2012, URL: http://www.3gpp.org/ftp/tsg_ran/WG1_RL1/TSGR1_68b/Docs/R1-121003.zip, 5 pages.

Nokia, et al., "Analysis of Half Duplex Operation for Low-Cost MTC UE," 3GPP TSG-RAN WG1#68b R1-121293, Mar. 20, 2012, URL: http://www.3gpp.org/ftp/tsg_ran/WG1_RL1/TSGR1_68b/Docs/R1-121293.zip, 4 pages.

* cited by examiner

HD-FDD HARQ OPERATION

CROSS REFERENCES

The present application for patent claims priority to U.S. Provisional Patent Application No. 61/991,230 by Sakhnini et al., entitled "HD-FDD HARQ Operation," filed May 9, 2014, assigned to the assignee hereof, and expressly incorporated by reference herein.

BACKGROUND

The following relates generally to wireless communication, and more specifically to half-duplex frequency division duplexing (HD-FDD) hybrid automatic repeat request (HARQ) operation. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Some types of wireless devices may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some wireless devices, including some MTC devices, may be an appropriate means of low cost (e.g., low energy, low complexity, etc.) wireless communication with a base station. In some cases, however, certain communications between a base station and a low complexity MTC device may be inefficient or unmanageable if the base station does not account for limitations of the MTC device. Accordingly, it may be beneficial to tailor base station and/or network operation to account for operating constraints of certain user equipment, such as MTC devices.

SUMMARY

The described features generally relate to one or more improved systems, methods, and/or apparatuses for half-duplex frequency division duplexing (HD-FDD) hybrid automatic repeat request (HARQ) operation that accounts or compensates for operating constraints or capabilities of a user equipment. A base station may receive a message from a user equipment (UE) indicative of a duplexing capability of the UE. The base station may then select a HARQ process limit based on the duplexing capability. In some examples, the base station may anticipate a collision between an uplink (UL) transmission and a downlink (DL) subframe based on the selected HARQ process limit. The base station may then schedule a transmission to avoid the anticipated collision. In some examples, the base station may limit a number of configurations available for channel quality indicator (CQI) or a precoding matrix indicator (PMI).

A method of HD-FDD HARQ operation is described. The method may include receiving a message from a UE indicative of a duplexing capability of the UE, and selecting a HARQ process limit based at least in part on the duplexing capability of the UE.

An apparatus for HD-FDD HARQ operation is described. The apparatus may include means for receiving a message from a UE indicative of a duplexing capability of the UE, and means for selecting a HARQ process limit based at least in part on the duplexing capability of the UE.

A further apparatus for HD-FDD HARQ operation is described. The apparatus may include a processor, memory in electronic communication with the processor, and instructions stored in the memory, the instructions being executable by the processor to cause the apparatus to receive a message from a UE indicative of a duplexing capability of the UE, and select a HARQ process limit based at least in part on the duplexing capability of the UE.

A non-transitory computer-readable medium for HD-FDD HARQ operation is also described. The non-transitory medium may store code, which may include instructions executable to receive a message from a UE indicative of a duplexing capability of the UE, and select a HARQ process limit based at least in part on the duplexing capability of the UE.

In some examples of the methods, apparatuses, or non-transitory computer-readable media described herein, the message identifies the duplexing capability of the UE. In some examples, the HARQ process limit may be or may include a scheduling mode for the UE. In some examples, the duplexing capability of the UE is an HD-FDD capability.

In some examples of the methods, apparatuses, or non-transitory computer-readable media described herein, the HARQ process limit includes a restriction to fewer than eight (8) UL HARQ processes. In some examples the HARQ process limit comprises a restriction to three (3) UL HARQ processes.

Some examples of the method, apparatuses, or non-transitory computer-readable media described herein may further include features of, means for, and/or processor-executable instructions for anticipating a collision between an UL transmission and a DL subframe based on the selected HARQ process limit, and scheduling a transmission to avoid the anticipated collision. Some examples include scheduling the transmission to avoid the anticipated collision comprising puncturing a UL subframe.

In some examples of the method, apparatuses, or non-transitory computer-readable media described herein, puncturing a UL subframe includes refraining from transmitting an UL grant. In some examples, puncturing a UL subframe includes suspending an UL retransmission by transmitting an early acknowledgement (ACK) message.

Some examples of the method, apparatuses, or non-transitory computer-readable media described herein may further include features of, means for, and/or processor-executable instructions for transmitting an UL grant to resume a HARQ transmission in a subsequent subframe upon avoiding the anticipated collision. Some examples comprise the DL subframe comprises a subframe zero (SF0) or a subframe five (SF5).

In some examples of the method, apparatuses, or non-transitory computer-readable media (PBCH) transmission, a paging transmission, a system information message, or a synchronization channel.

Some examples of the method, apparatuses, or non-transitory computer-readable media described herein may further include features of, means for, and/or processor-executable instructions for limiting a number of configurations available for CQI or PMI.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods, and/or apparatuses for half-duplex frequency division duplexing (HD-FDD) hybrid automatic repeat request (HARQ) operation. User equipment, including MTC devices, that employ HD-FDD communications may switch a radio from transmit to receive mode in order to bi-directionally communicate with a base station. That is, the device may by unable to transmit and receive simultaneously. There may be a delay (e.g., 1 ms) associated with the transition (e.g., switching) from transmit mode to receive mode. This delay may interfere with synchronous uplink (UL) HARQ operation, in which there may be a constant delay (e.g., 4 ms or subframes) between UL subframes and the associated HARQ response on the downlink (DL). In synchronous UL HARQ operation, there may also be a constant delay between DL control frames and UL subframes. HD-FDD operation may result in circumstances where a device is not prepared to receive (or transmit) the appropriate response based on being in the wrong radio mode. Accordingly, a base station may adjust its operation with respect to an MTC device (or other user equipment) to account for such HD-FDD operation.

A base station may receive a message from a user equipment (UE) indicative of a duplexing capability of the UE. The base station may then select a HARQ process limit based on the duplexing capability. In some examples, the base station may anticipate a collision between an uplink (UL) transmission and a downlink (DL) subframe based on the selected HARQ process limit. The base station may then schedule a transmission to avoid the anticipated collision. In some examples, the base station may limit a number of configurations available for channel quality indicator (CQI) or a precoding matrix indicator (PMI). Thus, a base station may enable an HD-FDD device (e.g., an MTC device) to perform synchronous UL HARQ processes while avoiding conflicts between the timing for uplink and downlink transmissions.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
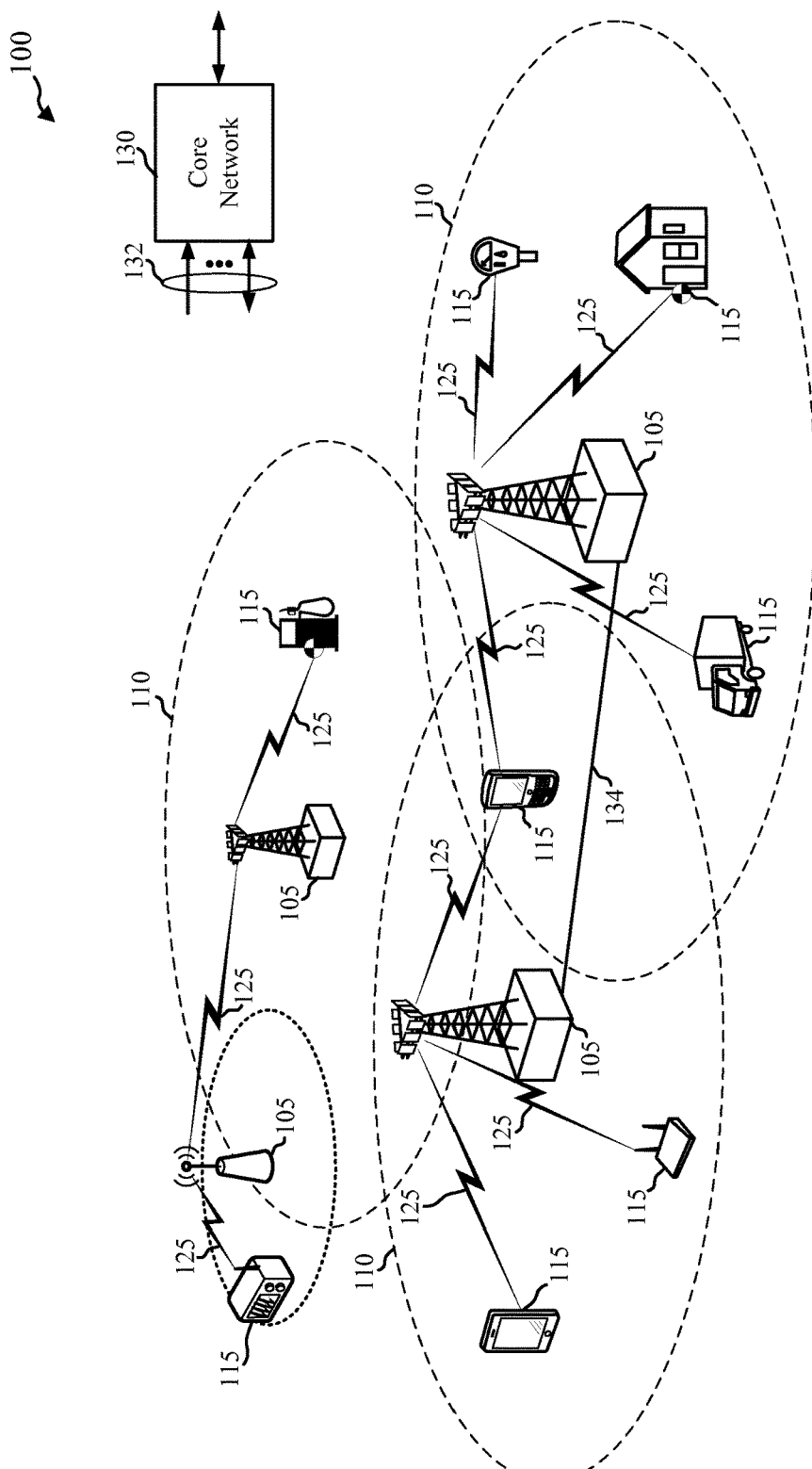
FIG. 1 illustrates an example of a wireless communications system in accordance with various aspects of the present disclosure.

FIG. 1 illustrates an example of a wireless communications system 100 in accordance with various embodiments. The system 100 includes base stations 105, communication devices, also known as a user equipment user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

Two way communications between a base station 105 and a UE 115 may be accomplished according to a process known as duplexing. For example, devices (e.g., a base station 105 or a UE 115) may communicate according to a time division duplexing (TDD) method in which a single frequency band may be used for both uplink and downlink. Devices may also communicate according to a frequency division duplexing (FDD) method in which different frequencies are used for uplink and downlink. Devices may also utilize full-duplex (FD) or half-duplex (HD) communication methods. A FD device may transmit and receive simultaneously. An HD device may alternate between transmitting and receiving. Some devices may be capable of more than one communication mode. For example, a device may be capable of both TDD and FDD, or both FD and HD communications.

The base stations 105 may wirelessly communicate with the UEs 115 via one or more base station antennas. Each of the base station 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The geographic coverage area 110 for a base station may be divided into sectors making up a portion of the coverage area (not shown). The system 100 may include base stations 105 of different types (e.g., macro, micro, and/or pico base stations). There may be overlapping coverage areas for different technologies.

The system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul links 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be an MTC device, a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. Some of the UEs 115 within the system 100 may be low complexity MTC devices configured for HD-FDD communication.

The wireless communication link 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions. The base stations 105 may receive a message via a wireless communication link 125 from a UE 115, such a low complexity MTC device, indicative of a duplexing capability of the UE 115. The base station 105, or, in some embodiments, the core network 130, may select a HARQ process limit based on the duplexing capability of the UE 115.

Figure 2:
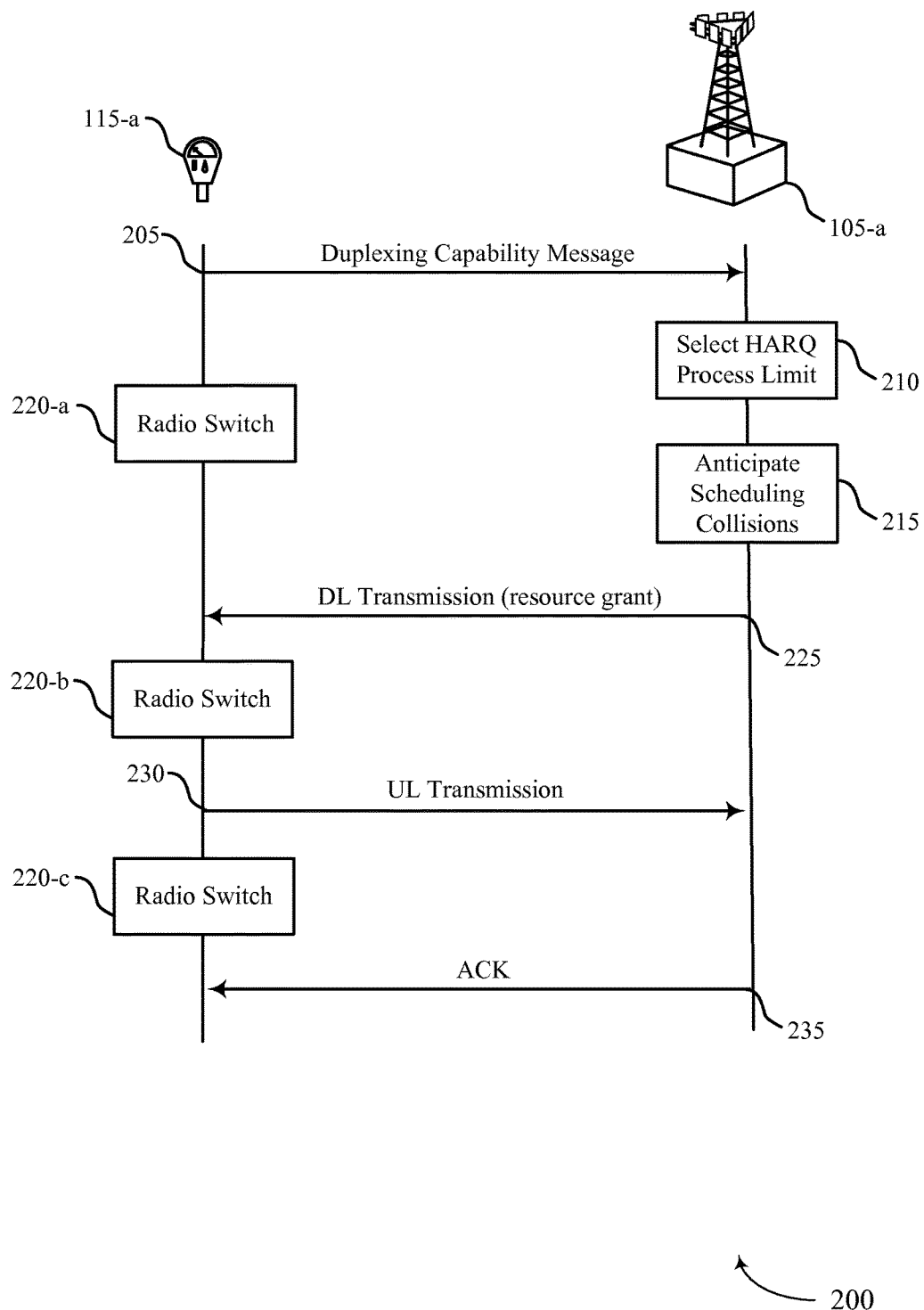
FIG. 2 illustrates an example of communication within a wireless communication system that supports HD-FDD HARQ operation in accordance with various aspects of the present disclosure.

FIG. 2 illustrates an example of wireless communication 200 within a system (e.g., system 100 of FIG. 1) configured for HD-FDD HARQ operation in accordance with various embodiments. The example 200 may include a UE 115-a (e.g., an MTC device) and a base station 105-a which may be examples of a UE 115 and a base station 105 of FIG. 1. The base station 105-a may receive a message 205 from a UE indicating a duplexing capability. For example, the message may state explicitly that the UE is an HD-FDD device. In another example, the base station 105-a may infer based on another aspect of the message (or based on multiple transmissions from the UE) that the UE 115-a is an HD-FDD device. In some examples, the UE 115-a may be capable of other operating modes but may be currently operating in HD-FDD mode, e.g., to conserve power.

Based on the message 205, the base station 105-a may select a HARQ process limit 210. The base station 105-a may select a maximum number of simultaneous UL HARQ processes to schedule. For example, there may be a constant delay (e.g., a 4 ms delay) between a DL transmission of a resource grant, an UL transmission, and/or a DL acknowledgement (ACK)/negative acknowledgement (NACK). Thus, the base station 105-a may limit the number of HARQ processes to 3 so that the UE 115-a may have time to make a radio switch between UL and DL HARQ frames.

In some cases, the base station 105-*a* may also anticipate collisions 215 between UL transmissions and DL transmissions based on the selected HARQ process limit. The base station 105-*a* may then schedule transmissions to avoid collisions. For example, scheduling the transmission to avoid the anticipated collision includes puncturing a UL subframe. In some examples, puncturing a UL subframe includes refraining from transmitting an UL grant. In some examples, puncturing a UL subframe includes suspending an UL retransmission by transmitting an early ACK message (or an ACK in place of a NACK). The base station 105-*a* may transmit an UL grant to resume a HARQ transmission in a subsequent subframe after the anticipated collision. For instance, the DL subframe may be a subframe zero (SF0) or a subframe five (SF5). That is, in a system specifying 10 subframes in each 10 ms frame with subframe numbers from 0-9, the DL subframes that the base station may schedule around may be the first subframe (SF0) or the sixth subframe (SF5). The DL subframe may be or include a physical broadcast channel (PBCH) transmission, a paging transmission, a system information message, or a synchronization channel. The base station 10-*a* 5 may limit a number of configurations available for channel quality indicator (CQI) or a precoding matrix indicator (PMI).

The base station 105-*a* may then send a DL transmission 225 to the UE 115-*a* based on the HARQ process limit and/or the schedule to avoid collisions. For example, the DL transmission may be a resource grant for an UL transmission 230. In some examples, the UE 115-*a* may perform a radio switch 220-*a* from transmit mode to receive mode prior to the transmission 225. The UE 115-*a* may then perform another radio switch 220-*b* from receive mode to transmit mode in order to make an UL transmission 230. The base station may receive the UL transmission 230 and send an ACK 235. The UE 115-*a* may perform another radio switch 220-*c* to receive the ACK. In general, the UE 115-*a* may perform a radio switch 220 after a sending or receiving a number of transmissions based on the HARQ process limit. For example, the UE 115-*a* may transmit 3 subframes and then perform a radio switch 220 to receive an ACK or NACK for each of the subframes. This may allow the UE 115-*a* to send and receive transmissions according to a synchronous schedule with a 4 subframe delay.

Figure 3A:
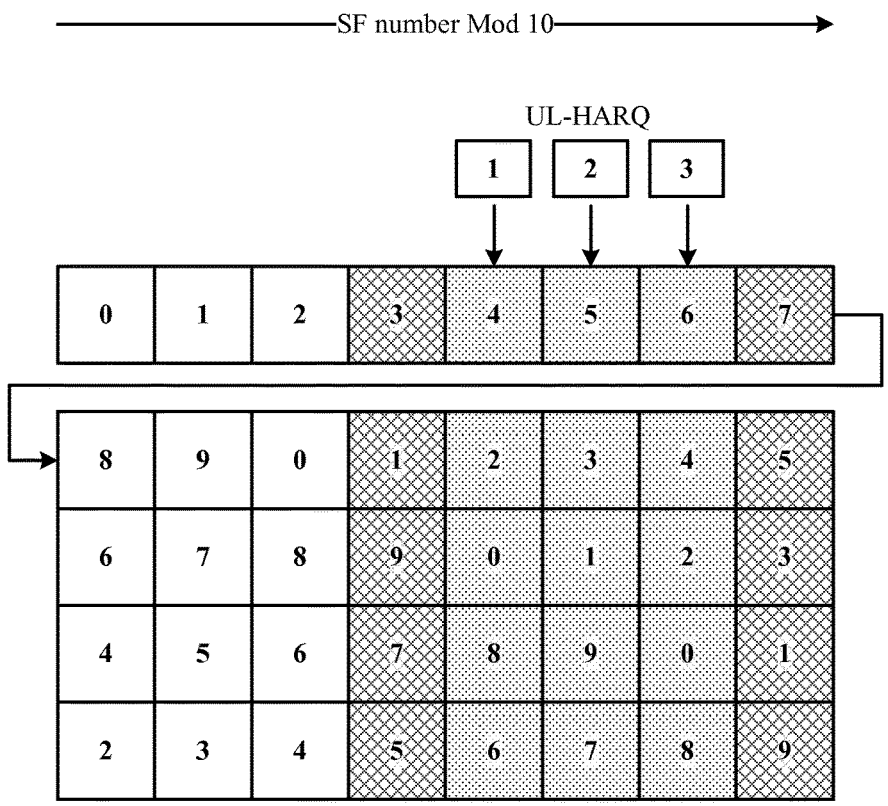
FIG. 3A illustrates an example of a schedule based on three (3) HD-FDD HARQ processes in accordance with various aspects of the present disclosure.
Figure 3A:
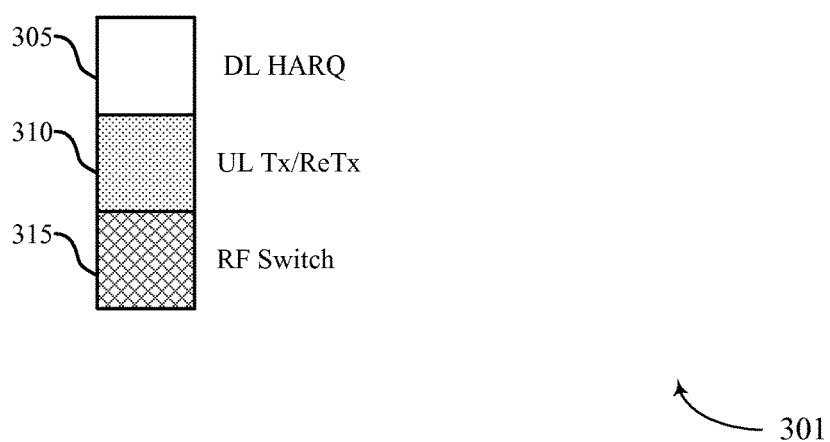

FIG. 3A illustrates an example of a schedule 301 based on three (3) HD-FDD HARQ operations in accordance with various embodiments. In some cases, HD-FDD operations include a delay of 1 subframe (e.g., 1 ms) for a UE 115 to complete a switch from transmit-to-receive (Tx-to-Rx) and from receive-to-transmit (Rx-to-Tx). In some examples, HD-FDD operation may be defined as part of an LTE "Frame structure type 1." Thus, HD-FDD may follow the HARQ timeline defined for Frame Structure Type 1. That is, it may employ synchronous scheduling to schedule UL HARQ operations. For example, there may be a delay of 4 subframes between physical uplink shared channel (PUSCH) transmissions and HARQ-ACK transmissions. There may also be a delay of 4 subframes between physical downlink control channel (PDCCH), evolved PDCCH (EP-DCCH) or physical HARQ indicator channel (PHICH) transmissions and PUSCH transmissions.

Scheduling for an HD-FDD UE engaging UL data transfer may be driven primarily by the UL HARQ limitations. In some examples, the maximum number of UL HARQ processes may be limited to 3. That is, three DL transmissions (e.g., DL HARQ subframes) 305 may be sent by a base station 105, after which a UE 115 may perform a radio switch 315 lasting one subframe. In some examples, the DL transmissions (e.g., DL HARQ subframes) 305 may include grants for an UL transmission or an ACK/NACK transmission. Then the UE 115 may transmit three UL transmission/retransmission subframes 310, followed by another radio switch 315. The UL transmission/retransmission subframe 310 from the UE 115 may include data transmissions or retransmissions based on a NACK from the base station 105. Each subframe in a frame may be numbered from 0 to 9. Since one HARQ process cycle based on a HARQ process limit of 3 may take 8 subframes, and there are 10 subframes in each frame, the HARQ processes may not be synchronized with the frame numbers. That is, the least common multiple of 8 and 10 is 40, so the HARQ process may cycle five times (40 subframes) before beginning on a subframe having the same subframe number.

Figure 3B:
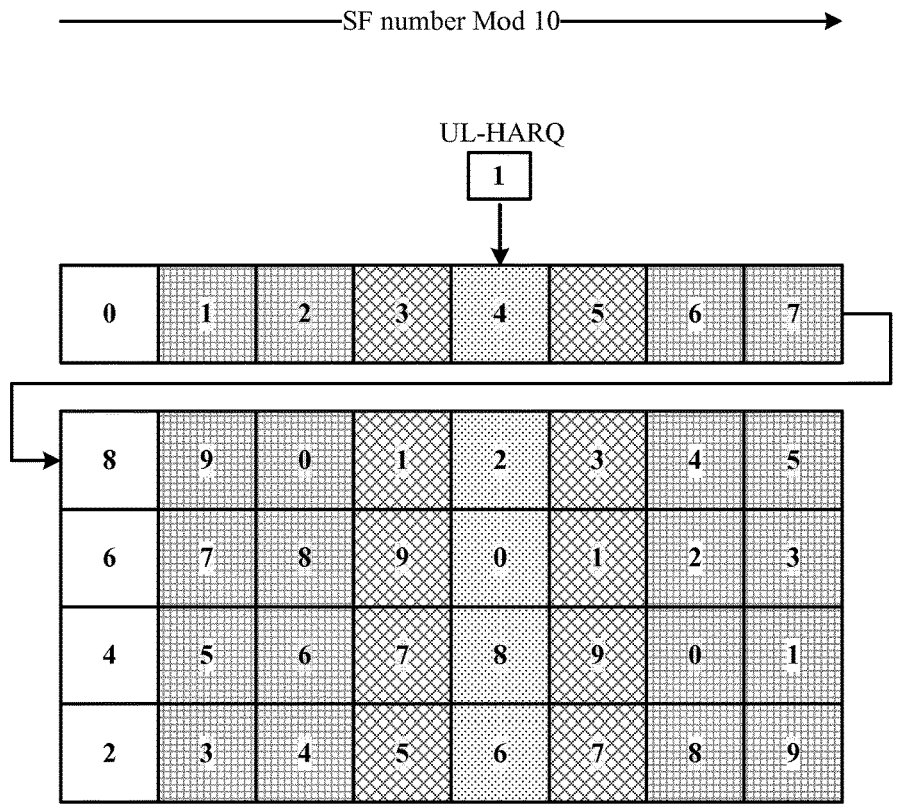
FIG. 3B illustrates an example of a schedule based on one (1) HD-FDD HARQ process in accordance with various aspects of the present disclosure.
Figure 3B:
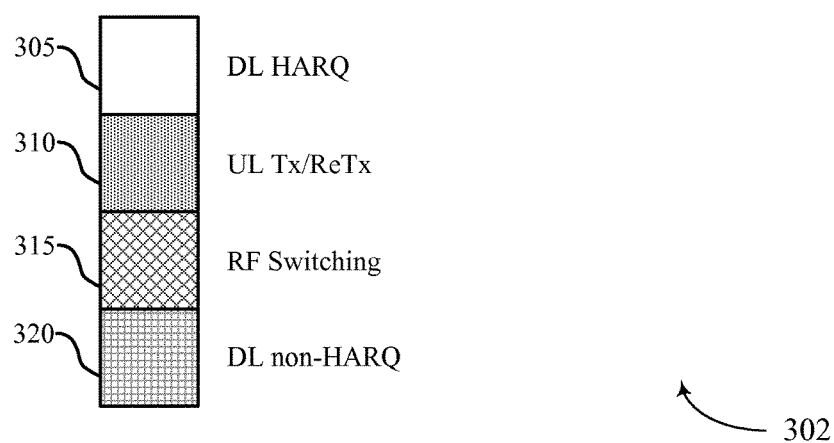

FIG. 3B illustrates an example of a schedule 302 based on one (1) HD-FDD HARQ process in accordance with various embodiments. The downlink (DL) HARQ subframes 305 may be used for downlink transmissions associated with a HARQ process (e.g., a resource grant or an ACK/NACK subframes). A single UL transmission (or retransmission) 310 may be scheduled 4 subframes before and after each DL HARQ subframe 305. A radio switch 315 may be performed before and after each UL transmission/retransmission subframe 310. Additional non-HARQ related DL transmissions 320 may be scheduled as well so that there remains a 4 ms delay for synchronous UL HARQ operations. As in FIG. 3A, the cycle may consist of 8 subframes, such that after 5 cycles the HARQ process begins on the same numbered subframe. In some examples, a schedule may be based on a HARQ process of 2 as well as 1 or 3 as depicted in FIGS. 3A and 3B.

Figure 4A:
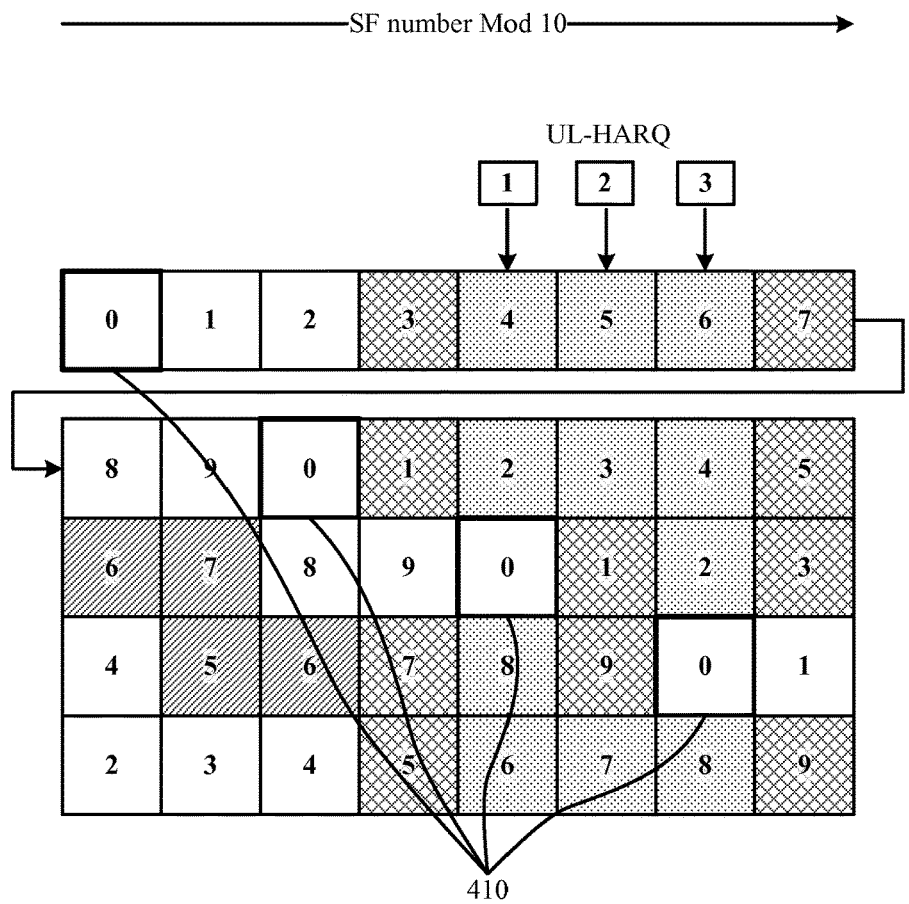
FIG. 4A illustrates an example of a schedule for HD-FDD HARQ operation in accordance with various aspects of the present disclosure.
Figure 4A:
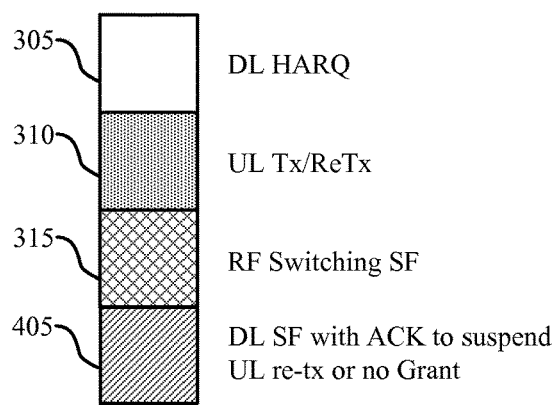

FIG. 4A illustrates an example of a schedule 401 for HD-FDD HARQ operation in accordance with various embodiments. Schedule 401 may include a cycle of 3 HARQ processes, and may incorporate aspects of FIG. 3A. Additionally, schedule 401 shows an example scheduler behavior for 3 UL-HARQ processes with UL puncturing to maintain PBCH. Three DL HARQ subframes 305 may be followed by a radio switch 315, followed by three UL transmission/retransmission subframes 310, followed by another radio switch 315. However, schedule 401 may be altered to ensure that each SF0 410 occurs on a DL HARQ subframe 305. PBCH transmissions may be sent on SF0 410 every radio frame, so if SF0 falls on a UL transmission/retransmission subframe 310 or radio switch 315 subframe, the UE may be unable to receive the PBCH transmissions.

The alteration of the schedule may be known as "puncturing" the HARQ process schedule. That is, a network scheduler (e.g., at a base station 105) may avoid UL transmission on SF0 410 of every radio frame by suspending transmission of grant for new transmission four (4) subframes earlier (e.g., on SF6) or by suspending UL re-transmissions by sending an ACK on PHICH four (4) subframes earlier. DL subframes 405 represent subframes scheduled in this manner. The scheduler (e.g., base station 105) may then use PDCCH to resume HARQ transmissions in subsequent subframes. This may result in improved reception of PBCH by the UE 115. Reception of other DL messages, such as system information block 1 (SIB1) or paging messages, on subframes other than SF0 may also be improved in the same manner depicted for PBCH.

Figure 4B:
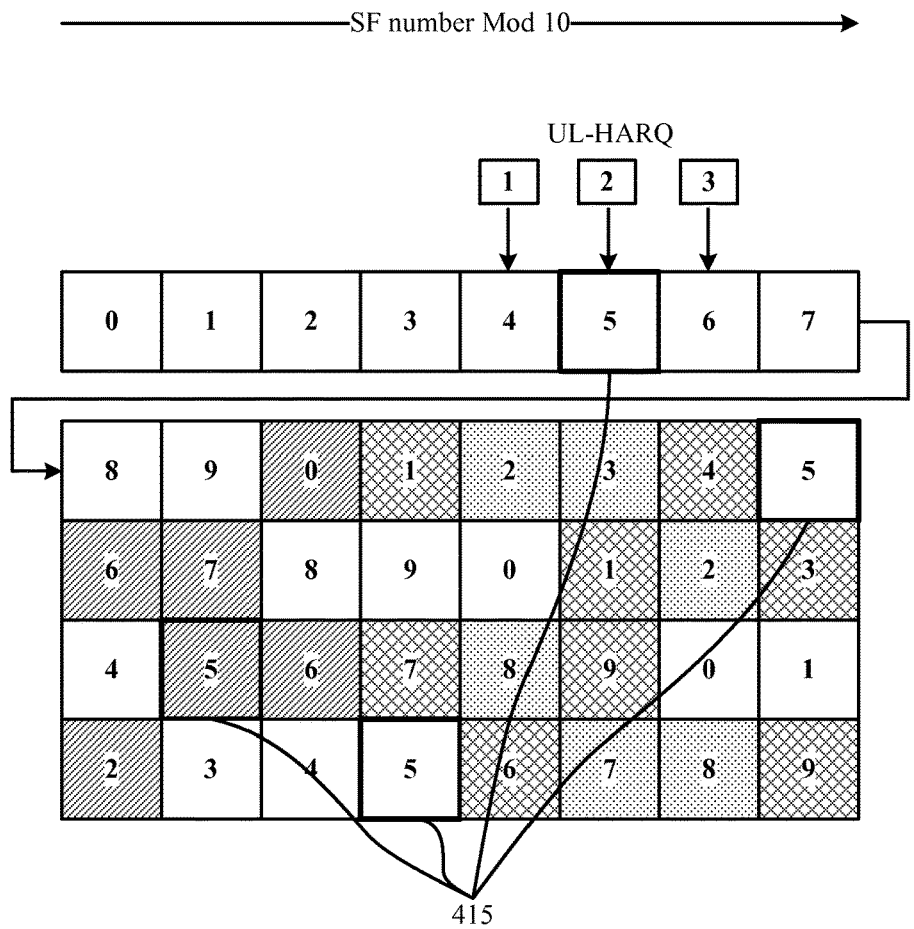
FIG. 4B illustrates an example of a schedule for HD-FDD HARQ operation in accordance with various aspects of the present disclosure.
Figure 4B:
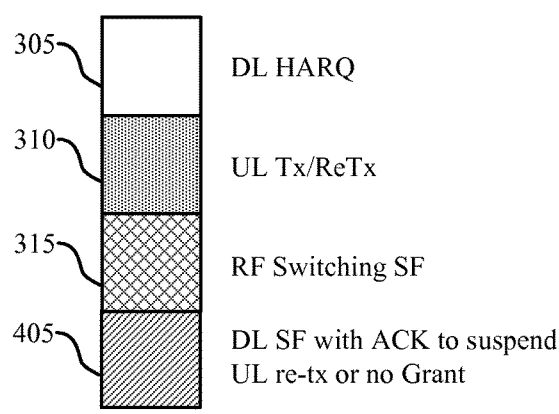

FIG. 4B illustrates an example of a schedule 402 for HD-FDD HARQ operation in accordance with various embodiments. Schedule 402 may include a cycle of 3 HARQ processes, and may incorporate aspects of FIGS. 3A and 4A. Additionally, schedule 402 shows an example of scheduler behavior for 3 UL-HARQ processes with UL puncturing to maintain both PBCH and cell identification reliability. That is, DL HARQ subframes 305 may be followed by a radio switch 315, followed by UL transmission/retransmission subframes 310, followed by another radio switch 315. However, schedule 402 may be configured to ensure that each SF0 (or in some cases, most SF0s) occurs on a DL HARQ subframe 305. Schedule 402 may be also be configured to ensure that each SF5 415 (or in some cases, most SF5s 415) occurs on a DL HARQ subframe 305 or subframe 405, which may be a DL puncturing subframe.

Figure 5:
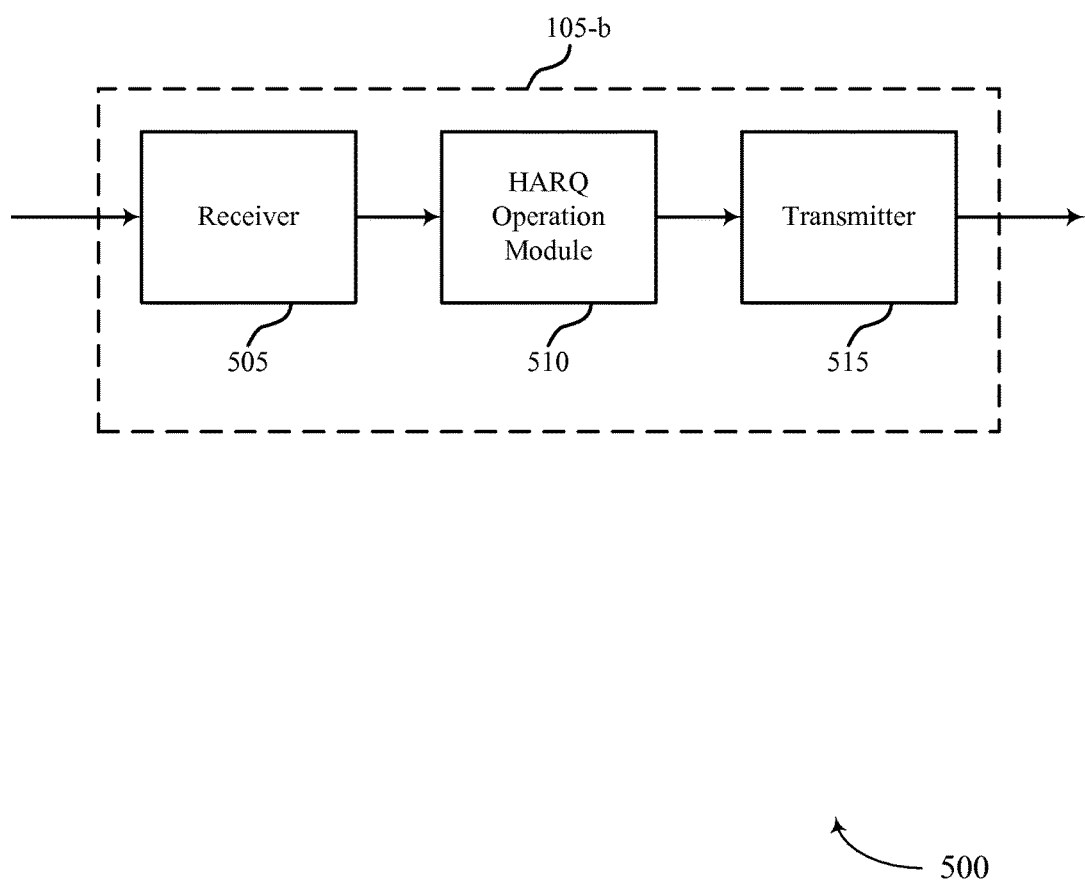
FIG. 5 shows a block diagram of a device that supports HD-FDD HARQ operation in accordance with various aspects of the present disclosure.

FIG. 5 shows a block diagram 500 of a base station 105-*b* for HD-FDD HARQ operation in accordance with various embodiments. The base station 105-*b* may be an example of one or more aspects of a base station 105 described with reference to FIGS. 1-4. The base station 105-*b* may include a receiver 505, a HARQ operation module 510, and/or a transmitter 515. The base station 105-*b* may also include a processor. Each of these components may be in communication with each other.

The components of the base station 105-*b* may, individually or collectively, be implemented with an application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, and/or control information associated with various information channels (e.g., control channels, data channels, etc.). Information may be passed on to the HARQ operation module 510, and to other components of the base station 105-*b*.

The HARQ operation module 510 may be configured to receive a message from a UE indicative of a duplexing capability of the UE. The HARQ operation module 510 may be configured to select a HARQ process limit based at least in part on the duplexing capability of the UE.

The transmitter 515 may transmit the one or more signals received from other components of the base station 105-*b*. In some embodiments, the transmitter 515 may be collocated with the receiver 505 in a transceiver module. The transmitter 515 may include a single antenna, or it may include a plurality of antennas.

Figure 6:
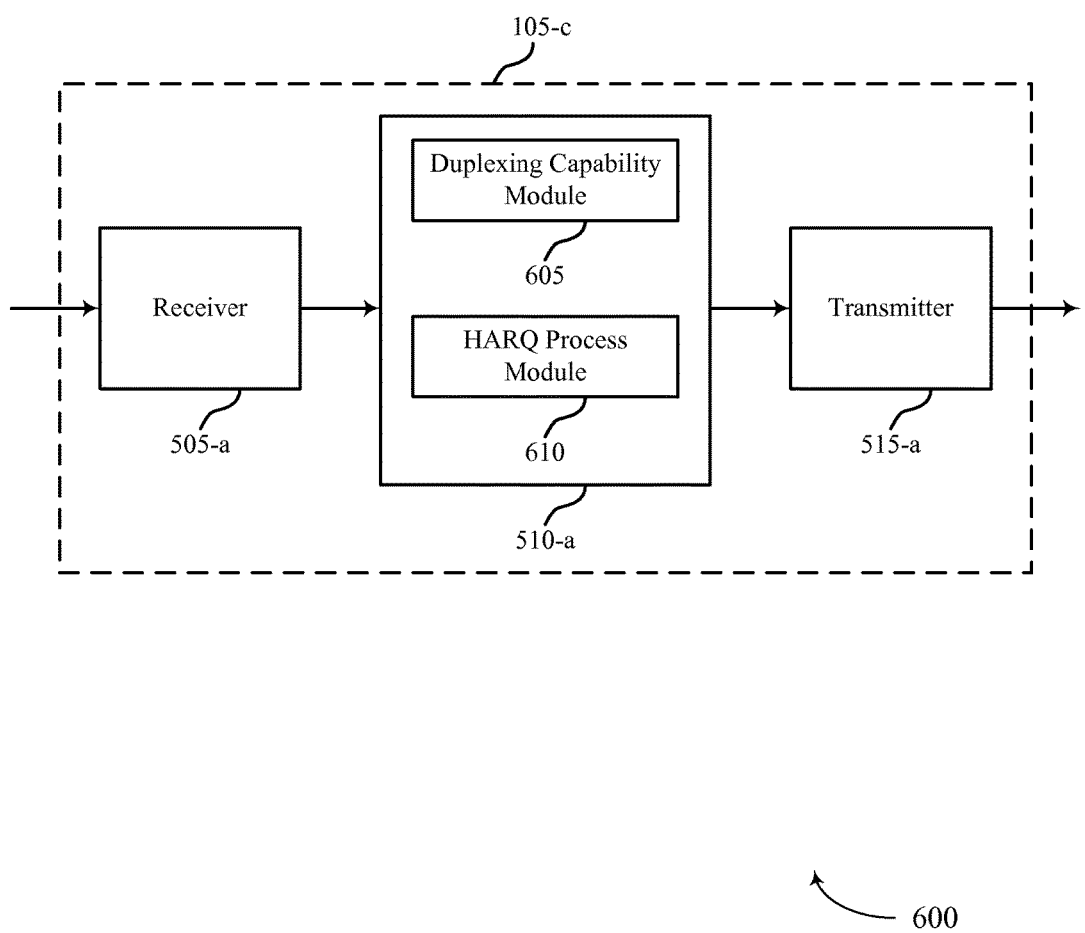
FIG. 6 shows a block diagram of a device that supports HD-FDD HARQ operation in accordance with various aspects of the present disclosure.

FIG. 6 shows a block diagram 600 of a base station 105-*c* for HD-FDD HARQ operation in accordance with various embodiments. The base station 105-*c* may be an example of one or more aspects of a base station 105 described with reference to FIGS. 1-5. The base station 105-*c* may include a receiver 505-*a*, a HARQ operation module 510-*a*, and/or a transmitter 515-*a*. The base station 105-*c* may also include a processor. Each of these components may be in communication with each other. The HARQ operation module 510-*a* may also include a duplexing capability module 605, and a HARQ process module 610.

The components of the base station 105-*c* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to the HARQ operation module 510-*a*, and to other components of the base station 105-*c*. The HARQ operation module 510-*a* may be configured to perform the operations described above with reference to FIG. 5. The transmitter 515-*a* may transmit the one or more signals received from other components of the base station 105-*c*.

The duplexing capability module 605 may be configured to receive a message from a UE indicative of a duplexing capability of the UE. In some examples, the message identifies the duplexing capability of the UE. In some examples, the duplexing capability of the UE may be an HD-FDD capability.

The HARQ process module 610 may be configured to select a HARQ process limit based at least in part on the duplexing capability of the UE. In some examples, the HARQ process limit may be or may include a scheduling mode for the UE. The HARQ process module 610 may be configured such that the HARQ process limit may include a restriction to fewer than eight (8) UL HARQ processes. In some examples, the HARQ process limit comprises a restriction to three (3) UL HARQ processes.

Figure 7:
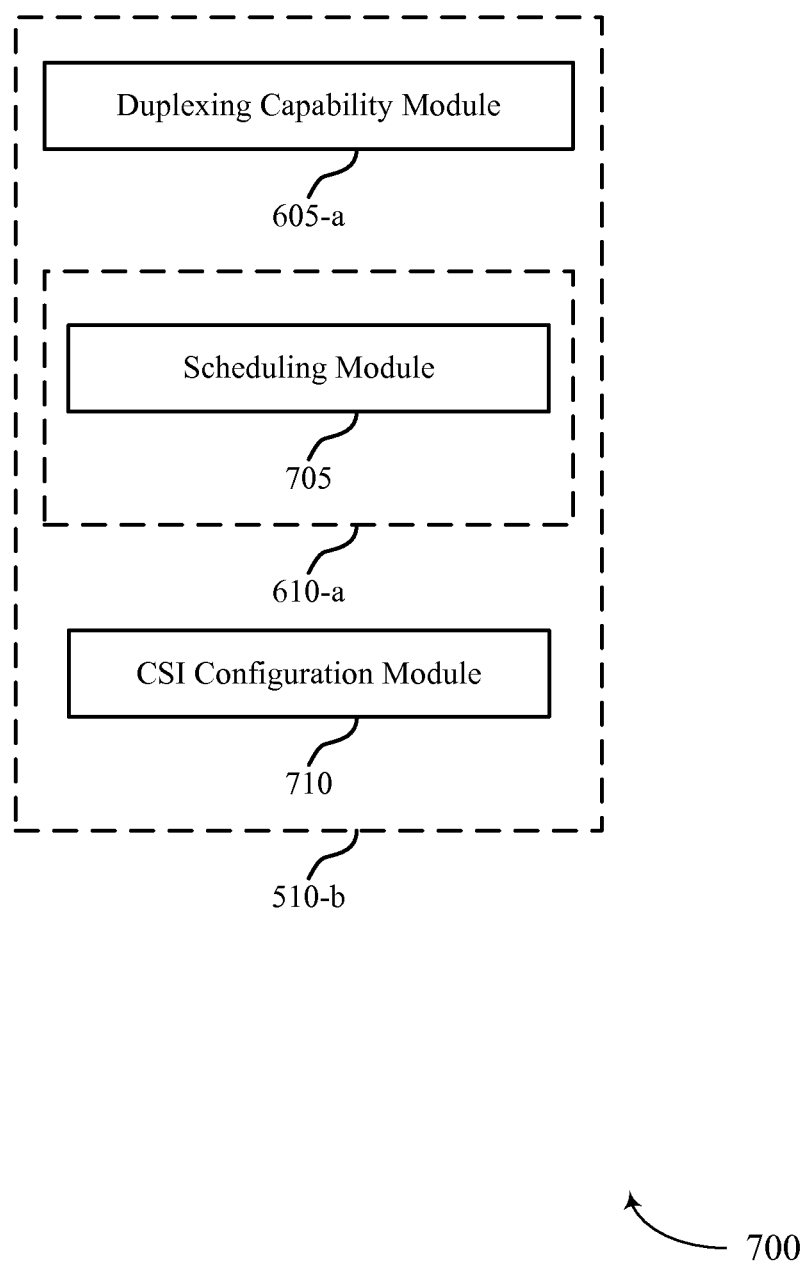
FIG. 7 shows a block diagram of a device that supports HD-FDD HARQ operation in accordance with various aspects of the present disclosure.

FIG. 7 shows a block diagram 700 of a HARQ operation module 510-*b* for HD-FDD HARQ operation in accordance with various embodiments. The HARQ operation module 510-*b* may be an example of one or more aspects of a HARQ operation module 510 described with reference to FIGS. 5-6. The HARQ operation module 510-*b* may include a duplexing capability module 605-*a*, and a HARQ process module 610-*a*. Each of these modules may perform the functions described above with reference to FIG. 6. The HARQ process module 610-*a* may also include a scheduling module 705 and the HARQ operation module 510-*b* may also include a channel state information (CSI) configuration module 710.

The components of the HARQ operation module 510-*b* may, individually or collectively, be implemented with one or more ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The scheduling module 705 may be configured to anticipate a collision between an UL transmission and a DL subframe based on the selected HARQ process limit. The scheduling module 705 may also be configured to schedule a transmission to avoid the anticipated collision. In some examples, scheduling the transmission to avoid the anticipated collision comprises puncturing a UL subframe. In some examples, puncturing a UL subframe comprises refraining from transmitting an UL grant. In some examples, puncturing a UL subframe comprises suspending an UL retransmission by transmitting an early ACK message. The scheduling module 705 may also be configured to transmit an UL grant to resume a HARQ transmission in a subsequent subframe upon avoiding the anticipated collision. In some examples, the DL subframe comprises a subframe zero (SF0) or a subframe five (SF5).

The CSI configuration module 710 may be configured to select a configuration for CQI or PMI. For example, it may limit a CSI configuration of a UE 115 based on the UE 115 operating in HD-FDD mode. For Periodic CSI reporting configuration, since the UL HARQ timelines may be aligned to 8 ms, all the CQI/PMI configurations (e.g., the CQI/PMI configurations defined in table 7.2.2-1A of 3GPP TS 36.213) may not be supported. For example, since the least common multiple of 8 (UL-HARQ alignment) and 10 (number of subframes in a frame) is 40, using a CQI/PMI cycle (also referred to as $N_{pd}$) of 5, 10 or 20 frames may not be possible. That is, the CSI configuration module may limit the configuration of CQI and/or PMI to cycles that are multiples of 40.

Figure 8:
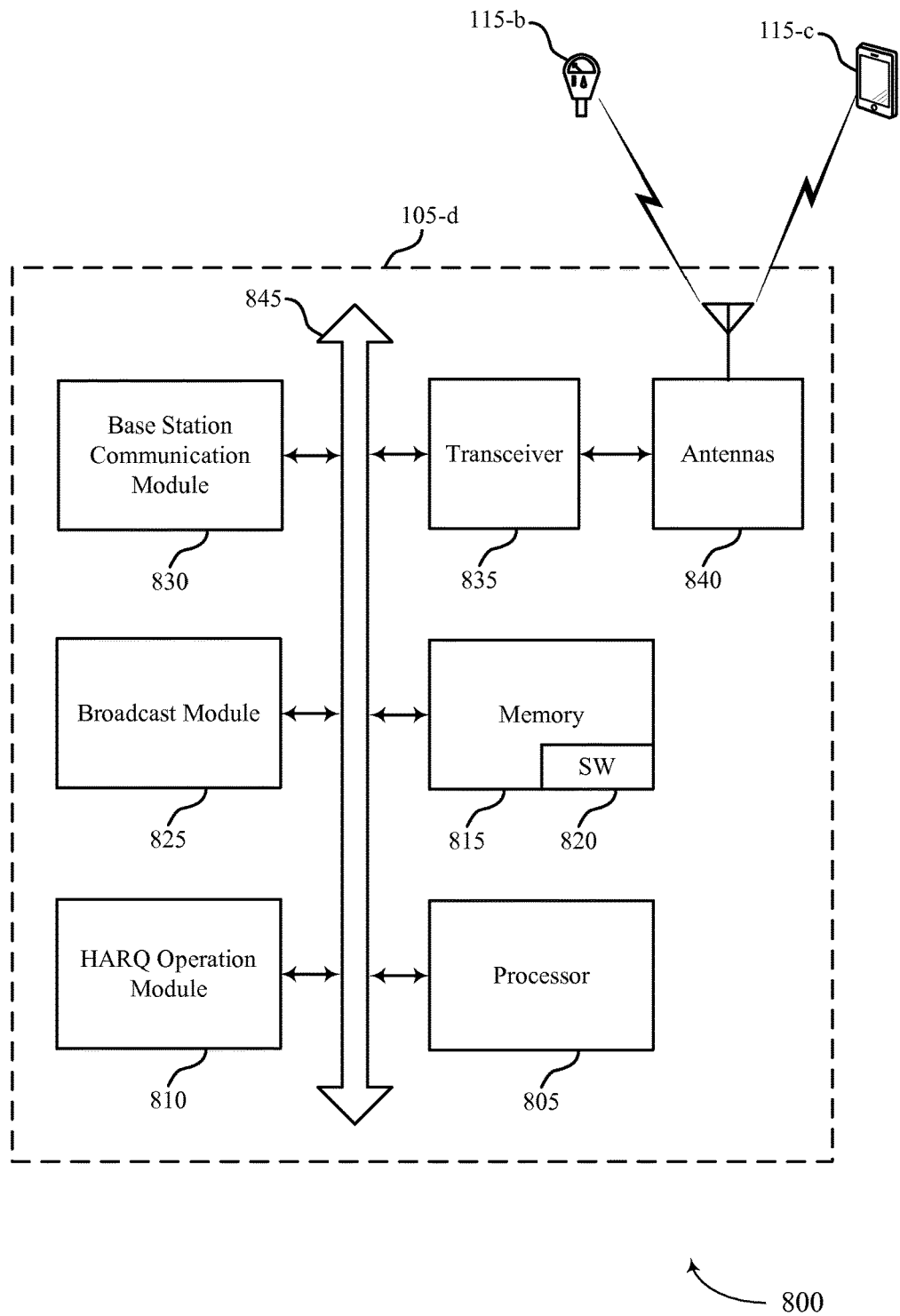
FIG. 8 illustrates a block diagram of a system that supports HD-FDD HARQ operation in accordance with various aspects of the present disclosure.

FIG. 8 shows a diagram of a system 800 for HD-FDD HARQ operation in accordance with various embodiments. System 800 may include a base station 105-d, which may be an example of a base station 105 described with reference to FIGS. 1-7. The base station 105-d may include a HARQ operation module 810, which may be an example of a HARQ operation module described with reference to FIGS. 5-7. The base station 105-d may also include a broadcast module 825. The base station 105-d may include components for bi-directional voice and data communications, including components for transmitting communications and components for receiving communications. For example, base station 105 may communicate with other base stations 105 (not shown) via an X2 interface via, for example, base station communication module 830, or it may communicate with an MTC UE 115-b or a non-MTC UE 115-c.

The broadcast module 825 may be configured to send PBCH transmissions, system information messages, synchronization channels, and other data that is directed to multiple UEs 115 in the geographic coverage area 110 of the base station 105. Broadcast module 825 may operate in coordination with transceiver 835 to transmit these messages, and may coordinate with HARQ operation module 810 to adjust HARQ operation schedules to avoid collisions with broadcast information.

The base station 105-d may also include a processor module 805, and memory 815 (including software (SW) 820) and one or more antenna(s) 840, which each may communicate, directly or indirectly, with each other (e.g., via one or more buses 845). The transceiver 835 may be configured to communicate bi-directionally, via the antenna(s) 840 and/or one or more wired or wireless links, with one or more networks, as described above. For example, the transceiver 835 may be configured to communicate bi-directionally with a UE 115. The transceiver 835 may include a modem configured to modulate the packets and provide the modulated packets to the antenna(s) 840 for transmission, and to demodulate packets received from the antenna(s) 840. While the base station 105-d may include a single antenna 840, the base station 105-d may also have multiple antennas 840 capable of concurrently transmitting and/or receiving multiple wireless transmissions. The transceiver 835 may also be capable of concurrently communicating with one or more base stations 105.

The memory 815 may include random access memory (RAM) and read only memory (ROM). The memory 815 may store computer-readable, computer-executable software/firmware code 820 containing instructions that are configured to, when executed, cause the processor module 805 to perform various functions described herein (e.g., identifying duplexing capabilities of a UE 115, selecting a HARQ process limit, avoiding collisions of UL HARQ transmission and PBCH, limiting CQI/PMI configurations, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an ASIC, etc. may include RAM and ROM. The memory 815 may store computer-readable, computer-executable software/firmware code 820 containing instructions that are configured to, when executed, cause the processor module 805 to perform various functions described herein (e.g., call processing, database management, processing of carrier mode indicators, reporting CSI, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a CPU, a microcontroller, an ASIC, etc.

Figure 9:
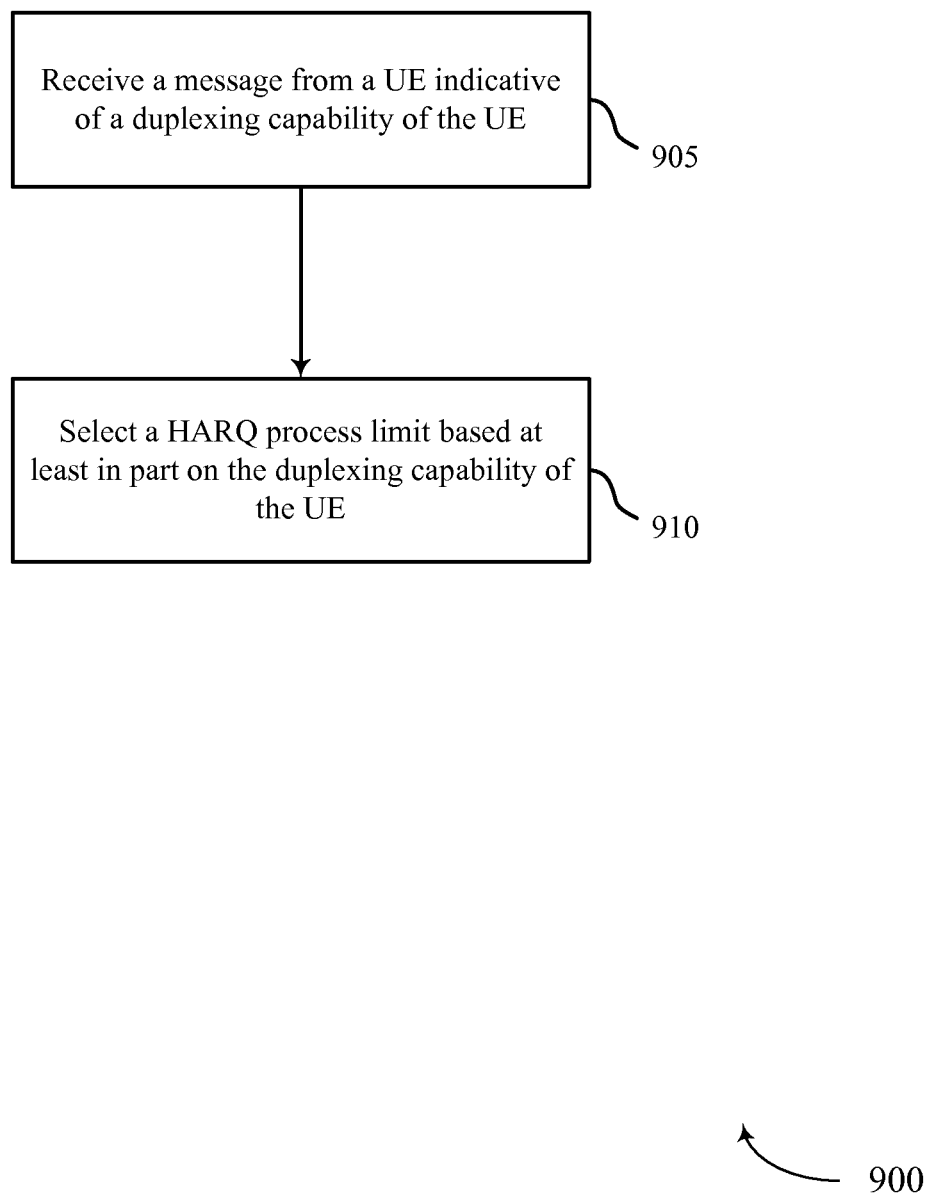
FIG. 9 shows a flowchart illustrating a method for HD-FDD HARQ operation in accordance with various aspects of the present disclosure.

FIG. 9 shows a flowchart 900 illustrating a method for HD-FDD HARQ operation in accordance with various embodiments. The functions of flowchart 900 may be implemented by a base station 105 or its components as described with reference to FIGS. 1-8. In certain examples, the blocks of the flowchart 900 may be implemented by the HARQ operation module described with reference to FIGS. 5-8.

At block 905, the base station 105 may receive a message from a UE indicative of a duplexing capability of the UE. For example, the message may indicate the UE capability explicitly or the base station 105 may infer based on one or more messages that the UE is an HD-FDD device. In certain examples, the functions of block 905 may be implemented by the duplexing capability module 605 as described above with reference to FIG. 6.

At block 910, the base station 105 may select a HARQ process limit based at least in part on the duplexing capability of the UE. In certain examples, the functions of block 910 may be implemented by the HARQ process module 610 as described above with reference to FIG. 6. In some examples, the steps of flowchart 900 may be accomplished by a network scheduler that is not collocated with a base station.

It should be noted that the method of flowchart 900 is just one implementation and that the operations of the method, and the steps may be rearranged or otherwise modified such that other implementations are possible.

Figure 10:
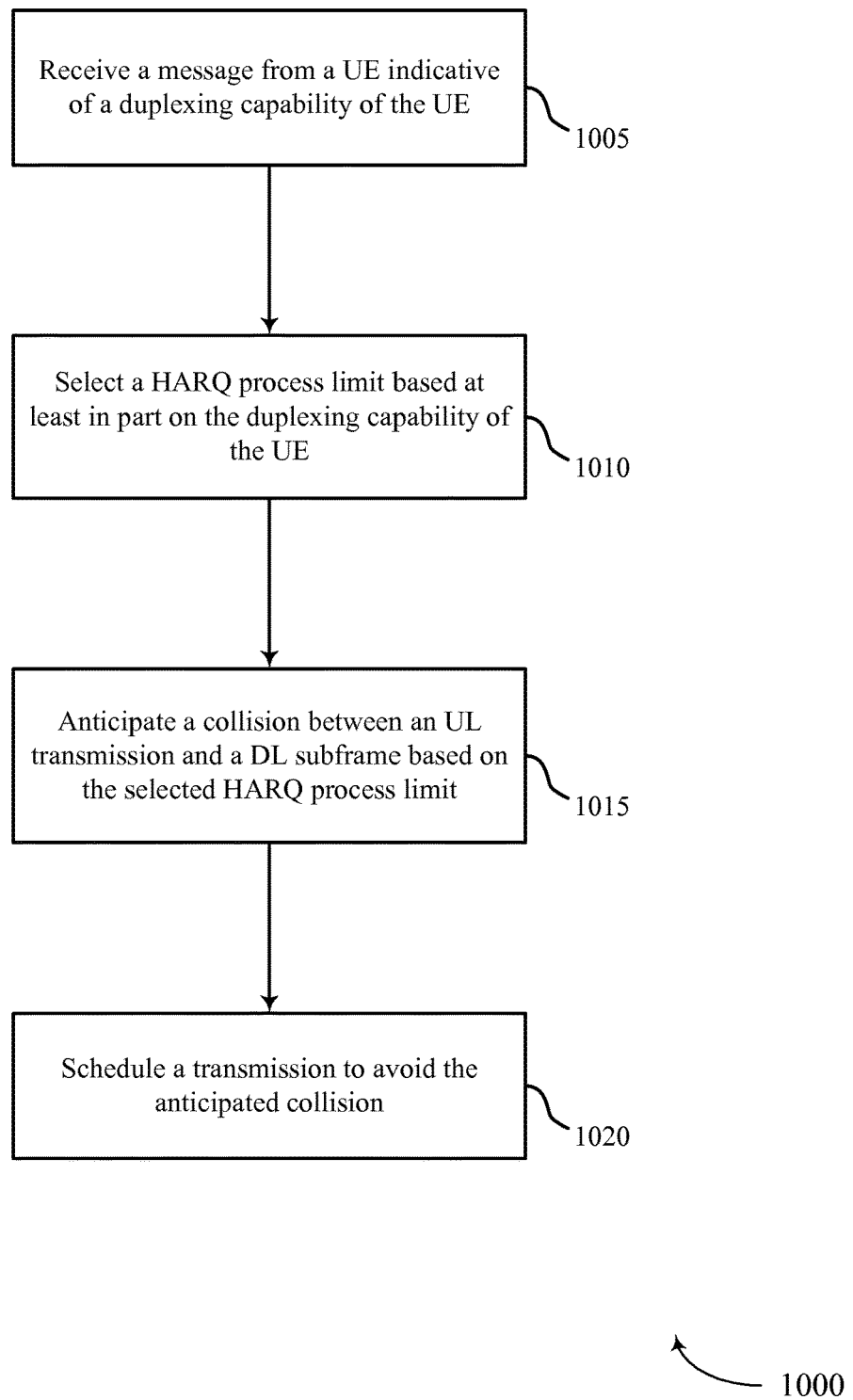
FIG. 10 shows a flowchart illustrating a method for HD-FDD HARQ operation in accordance with various aspects of the present disclosure.

FIG. 10 shows a flowchart 1000 illustrating a method for HD-FDD HARQ operation in accordance with various embodiments. The functions of flowchart 1000 may be implemented by a base station 105 or its components as described with reference to FIGS. 1-8. In certain examples, the blocks of the flowchart 1000 may be implemented by the HARQ operation module described with reference to FIGS. 5-8. The method described in flowchart 1000 may also incorporate aspects of flowchart 900 of FIG. 9.

At block 1005, the base station 105 may receive a message from a UE indicative of a duplexing capability of the UE. For example, the message may indicate the UE capability explicitly or the base station 105 may infer based on one or more messages that the UE is an HD-FDD device. In certain examples, the functions of block 1005 may be performed by the duplexing capability module 605 as described above with reference to FIG. 6.

At block 1010, the base station 105 may select a HARQ process limit based at least in part on the duplexing capability of the UE. In certain examples, the functions of block 1010 may be performed by the HARQ process module 610 as described above with reference to FIG. 6.

At block 1015, the base station 105 may anticipate a collision between an UL transmission and a DL subframe based on the selected HARQ process limit. In certain examples, the functions of block 1015 may be performed by the scheduling module 705 as described above with reference to FIG. 7.

At block 1020, the base station 105 may schedule a transmission to avoid the anticipated collision. In certain examples, the functions of block 1020 may be implemented by the scheduling module 705 as described above with reference to FIG. 7.

It should be noted that the method of flowchart 1000 is just one implementation and that the operations of the method, and the steps may be rearranged or otherwise modified such that other implementations are possible.

Figure 11:
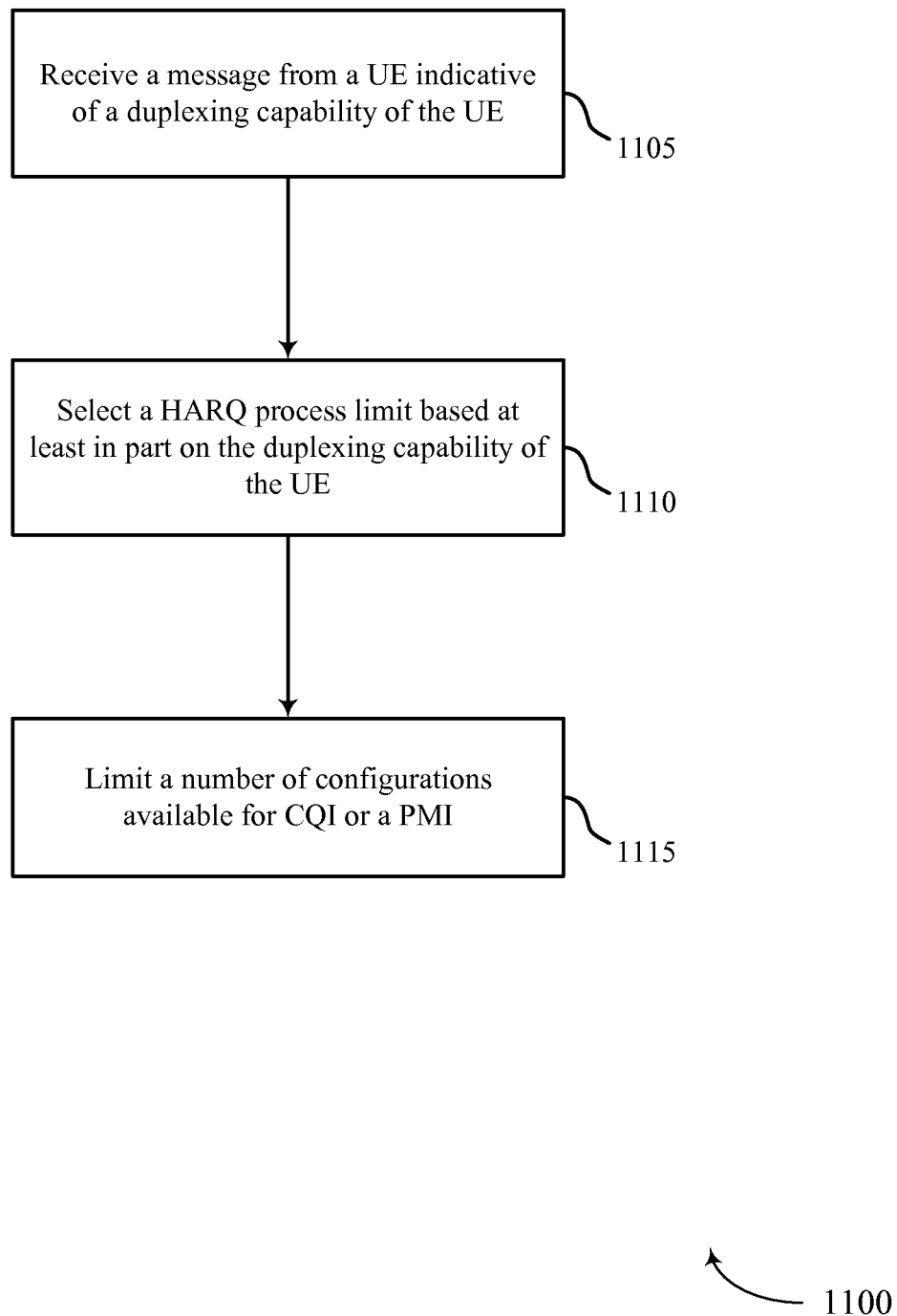
FIG. 11 shows a flowchart illustrating a method for HD-FDD HARQ operation in accordance with various aspects of the present disclosure.

FIG. 11 shows a flowchart 1100 illustrating a method for HD-FDD HARQ operation in accordance with various embodiments. The functions of flowchart 1100 may be implemented by a base station 105 or its components as described with reference to FIGS. 1-8. In certain examples, the blocks of the flowchart 1100 may be implemented by the HARQ operation module described with reference to FIGS. 5-8. The method described in flowchart 1100 may also incorporate aspects of flowcharts 900 to 1000 of FIGS. 9-10.

At block 1105, the base station 105 may receive a message from a UE indicative of a duplexing capability of the UE. For example, the message may indicate the UE capability explicitly and/or the base station 105 may infer based on one or more messages that the UE is an HD-FDD device. In certain examples, the functions of block 1105 may be performed by the duplexing capability module 605 as described above with reference to FIG. 6.

At block 1110, the base station 105 may select a HARQ process limit based at least in part on the duplexing capability of the UE. In certain examples, the functions of block 1110 may be implemented by the HARQ process module 610 as described above with reference to FIG. 6.

At block 1115, the base station 105 may limit a number of configurations available for CQI or a precoding matrix indicator (PMI). In certain examples, the functions of block 1115 may be implemented by the CSI configuration module 710 as described above with reference to FIG. 7.

It should be noted that the method of flowchart 1100 is just one implementation and that the operations of the method, and the steps may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of wireless communication, comprising:
   receiving, at a base station, a message from a user equipment (UE) indicating that the UE is operating in a half-duplexing mode;
   selecting, by the base station, a number of synchronous hybrid automatic repeat request (HARQ) processes for communication with the UE based at least in part on the message indicating that the UE is operating in the half-duplexing mode;
   anticipating, by the base station, a collision between an UL transmission and a downlink (DL) subframe based on the selected number of synchronous HARQ processes for communication with the UE; and
   scheduling, by the base station, uplink and downlink transmissions with the UE to avoid the anticipated collision according to the selected number of synchronous HARQ processes for communication with the UE and based at least in part on the message indicating that the UE is operating in the half-duplexing mode.

2. The method of claim 1, wherein the received message indicates that the UE is operating according to a half-duplex frequency division duplexing (HD-FDD).

3. The method of claim 2, wherein the selected number of synchronous HARQ processes for communication with the UE comprises fewer than eight (8) uplink (UL) HARQ processes.

4. The method of claim 1, wherein scheduling uplink and downlink transmissions to avoid the anticipated collision comprises:
   puncturing a UL subframe.

5. The method of claim 4, wherein puncturing the UL subframe comprises:
   refraining from transmitting an UL grant for the UL subframe.

6. The method of claim 4, wherein puncturing the UL subframe comprises:
   transmitting an acknowledgement (ACK) message to suspend an UL retransmission for the UL subframe.

7. The method of claim 6, wherein scheduling uplink and downlink transmissions to avoid the anticipated collision further comprises:
   transmitting, by the base station, an UL grant to resume a HARQ transmission in a subframe subsequent to the punctured subframe.

8. The method of claim 1, wherein the DL subframe comprises a subframe zero (SF0) or a subframe five (SF5).

9. The method of claim 1, wherein anticipating a collision between an UL transmission and a DL subframe comprises:
   anticipating a collision between the UL transmission and at least one of a physical broadcast channel (PBCH) transmission, a paging transmission, a system information message, or a synchronization channel.

10. A method of wireless communication, comprising:
    receiving, at a base station, a message from a user equipment (UE) indicating that the UE is operating in a half-duplexing mode;
    selecting, by the base station, a number of synchronous hybrid automatic repeat request (HARQ) processes for communication with the UE based at least in part on the message indicating that the UE is operating in the half-duplexing mode;
    limiting, by the base station, a number of periodicity and offset configurations available for channel quality indicator (CQI) or a precoding matrix indicator (PMI) based at least in part on the message indicating that the UE is operating in the half-duplexing mode; and
    scheduling, by the base station, uplink and downlink transmissions with the UE according to the selected number of synchronous HARQ processes for communication with the UE, and based at least in part on the message indicating that the UE is operating in the half-duplexing mode and the limited number of periodicity and offset configurations available for CQI or PMI.

11. An apparatus for wireless communication at a base station, comprising:
    means for receiving a message from a user equipment (UE) indicating that the UE is operating in a half-duplexing mode;
    means for selecting a number of synchronous hybrid automatic repeat request (HARQ) processes for communication with the UE based at least in part on the message indicating that the UE is operating in the half-duplexing mode;

means for anticipating a collision between an UL transmission and a downlink (DL) subframe based on the selected number of synchronous HARQ processes for communication with the UE; and means for scheduling uplink and downlink transmissions with the UE to avoid the anticipated collision according to the selected number of synchronous HARQ processes for communication with the UE and based at least in part on the message indicating that the UE is operating in the half-duplexing mode.

12. The apparatus of claim 11, wherein the received message indicates that the UE is operating according to a half-duplex frequency division duplexing (HD-FDD) mode.

13. The apparatus of claim 12, wherein the selected number of synchronous HARQ processes for communication with the UE comprises fewer than eight (8) uplink (UL) HARQ processes.

14. The apparatus of claim 11, wherein the means for scheduling uplink and downlink transmissions to avoid the anticipated collision comprises:
    means for puncturing a UL subframe.

15. The apparatus of claim 14, wherein the means for puncturing the UL subframe comprises:
    means for refraining from transmitting an UL grant for the UL subframe.

16. The apparatus of claim 14, wherein the means for puncturing the UL subframe comprises:
    means for transmitting an acknowledgement (ACK) message to suspend an UL retransmission for the UL subframe.

17. The apparatus of claim 16, wherein the means for scheduling uplink and downlink transmissions to avoid the anticipated collision further comprises:
    means for transmitting an UL grant to resume a HARQ transmission in a subframe subsequent to the punctured subframe.

18. An apparatus for wireless communication at a base station, comprising:
    means for receiving a message from a user equipment (UE) indicating that the UE is operating in a half-duplexing mode;
    means for selecting a number of synchronous hybrid automatic repeat request (HARQ) processes for communication with the UE based at least in part on the message indicating that the UE is operating in the half-duplexing mode;
    means for limiting a number of periodicity and offset configurations available for channel quality indicator (CQI) or a precoding matrix indicator (PMI) based at least in part on the message indicating that the UE is operating in the half-duplexing mode; and
    means for scheduling uplink and downlink transmissions with the UE according to the selected number of synchronous HARQ processes for communication with the UE, and based at least in part on the message indicating that the UE is operating in the half-duplexing mode and the limited number of periodicity and offset configurations available for CQI or PMI.

19. An apparatus for wireless communication at a base station, comprising a processor, memory in electronic communication with the processor and instructions stored in the memory, the instructions being executable by the processor to cause the apparatus to:
    receive a message from a user equipment (UE) indicating that the UE is operating in a half-duplexing mode;
    select a number of synchronous hybrid automatic repeat request (HARQ) processes for communication with the UE based at least in part on the message indicating that the UE is operating in the half-duplexing mode;
    anticipate a collision between an UL transmission and a downlink (DL) subframe based on the selected number of synchronous HARQ processes for communication with the UE; and
    schedule, by the base station, uplink and downlink transmissions with the UE to avoid the anticipated collision according to the selected number of synchronous HARQ processes for communication with the UE and based at least in part on the message indicating that the UE is operating in the half-duplexing mode.

20. The apparatus of claim 19, wherein the received message indicates that the UE is operating according to a half-duplex frequency division duplexing (HD-FDD) capability.

21. The apparatus of claim 20, wherein the selected number of synchronous HARQ processes for communication with the UE comprises fewer than eight (8) uplink (UL) HARQ processes.

22. The apparatus of claim 19, wherein the instructions to schedule uplink and downlink transmissions to avoid the anticipated collision are executable by the processor to cause the apparatus to:
    puncturing a UL subframe.

23. The apparatus of claim 22, wherein the instructions to puncture the UL subframe are executable by the processor to cause the apparatus to:
    refrain from transmitting an UL grant for the UL subframe.

24. The apparatus of claim 22, wherein the instructions to puncture the UL subframe are executable by the processor to cause the apparatus to:
    transmit an acknowledgement (ACK) message to suspend an UL retransmission for the UL subframe.

25. The apparatus of claim 24, wherein the instructions to schedule uplink and downlink transmissions to avoid the anticipated collision are further executable by the processor to cause the apparatus to:
    transmit an UL grant to resume a HARQ transmission in a subframe subsequent to the punctured subframe.

26. An apparatus for wireless communication at a base station, comprising a processor, memory in electronic communication with the processor and instructions stored in the memory, the instructions being executable by the processor to cause the apparatus to:
    receive a message from a user equipment (UE) indicating that the UE is operating in a half-duplexing mode;
    select a number of synchronous hybrid automatic repeat request (HARQ) processes for communication with the UE based at least in part on the message indicating that the UE is operating in the half-duplexing mode;
    limit a number of periodicity and offset configurations available for channel quality indicator (CQI) or a precoding matrix indicator (PMT) based at least in part on the message indicating that the UE is operating in the half-duplexing mode; and
    schedule, by the base station, uplink and downlink transmissions with the UE according to the selected number of synchronous HARQ processes for communication with the UE, and based at least in part on the message indicating that the UE is operating in the half-duplexing mode and the limited number of periodicity and offset configurations available for CQI or PMI.

27. A non-transitory computer-readable medium storing code for wireless communication, the code comprising instructions executable to:
receive, at a base station, a message from a user equipment (UE) indicating that the UE is operating in a half-duplexing mode;
select, by the base station, a number of synchronous hybrid automatic repeat request (HARQ) processes for communication with the UE based at least in part on the message indicating that the UE is operating in the half-duplexing mode;
anticipate a collision between an UL transmission and a downlink (DL) subframe based on the selected number of synchronous HARQ processes for communication with the UE; and
schedule, by the base station, uplink and downlink transmissions with the UE to avoid the anticipated collision according to the selected number of synchronous HARQ processes for communication with the UE and based at least in part on the message indicating that the UE is operating in the half-duplexing mode.

28. A method of wireless communication, comprising:
receiving, at a base station, a message from a user equipment (UE) indicating that the UE is operating in a half-duplexing mode;
selecting, by the base station, a number of synchronous hybrid automatic repeat request (HARQ) processes for communication with the UE based at least in part on the message indicating that the UE is operating in the half-duplexing mode;
scheduling a plurality of sequential radio frame intervals, each of the plurality of radio frame intervals having a different configuration of uplink and downlink subframes based at least in part on the selected number of synchronous HARQ processes for communication with the UE; and
scheduling, by the base station, uplink and downlink transmissions with the UE based at least in part on the message indicating that the UE is operating in the half-duplexing mode and the scheduled plurality of sequential radio frame intervals.

29. The method of claim 28, wherein scheduling the plurality of sequential radio frame intervals is based at least in part on a repeating pattern of uplink and downlink subframes, wherein the repeating pattern is based at least in part on the selected number of synchronous HARQ processes for communication with the UE and has a duration that is different from a duration of each of the plurality of radio frame intervals.

30. An apparatus for wireless communication at a base station, comprising:
means for receiving a message from a user equipment (UE) indicating that the UE is operating in a half-duplexing mode;
means for selecting a number of synchronous hybrid automatic repeat request (HARQ) processes for communication with the UE based at least in part on the message indicating that the UE is operating in the half-duplexing mode;
means for scheduling a plurality of sequential radio frame intervals, each of the plurality of radio frame intervals having a different configuration of uplink and downlink subframes based at least in part on the selected number of synchronous HARQ processes for communication with the UE; and
means for scheduling uplink and downlink transmissions with the UE based at least in part on the message indicating that the UE is operating in the half-duplexing mode and the scheduled plurality of sequential radio frame intervals.

31. The apparatus of claim 30, wherein the means for scheduling the plurality of sequential radio frame intervals is operable based at least in part on a repeating pattern of uplink and downlink subframes, wherein the repeating pattern is based at least in part on the selected number of synchronous HARQ processes for communication with the UE and has a duration that is different from a duration of each of the plurality radio frame intervals.

32. An apparatus for wireless communication at a base station, comprising a processor, memory in electronic communication with the processor and instructions stored in the memory, the instructions being executable by the processor to cause the apparatus to:
receive a message from a user equipment (UE) indicating that the UE is operating in a half-duplexing mode;
select a number of synchronous hybrid automatic repeat request (HARQ) processes for communication with the UE based at least in part on the message indicating that the UE is operating in the half-duplexing mode;
schedule a plurality of sequential radio frame intervals, each of the plurality of radio frame intervals having a different configuration of uplink and downlink subframes based at least in part on the selected number of synchronous HARQ processes for communication with the UE; and
schedule uplink and downlink transmissions with the UE based at least in Part on the message indicating that the UE is operating in the half-duplexing mode and the scheduled plurality of sequential radio frame intervals.

33. The apparatus of claim 32, wherein the instructions to schedule the plurality of sequential radio frame intervals are based at least in part on a repeating pattern of uplink and downlink subframes, wherein the repeating pattern is based at least in part on the selected number of synchronous HARQ processes for communication with the UE and has a duration that is different from a duration of each of the plurality of radio frame intervals.

* * * * *